United States Patent [19]

Kazeil et al.

[11] 4,299,528

[45] Nov. 10, 1981

[54] COMBINATION WHEELCHAIR LIFT AND STEPS FOR VEHICLE DOORWAYS

[76] Inventors: James E. Kazeil; Joseph Kazeil, both of Box 5036, Regina, Saskatchewan, Canada

[21] Appl. No.: 124,241

[22] Filed: Feb. 25, 1980

[51] Int. Cl.[3] .................................................. B60P 1/44

[52] U.S. Cl. ...................................... 414/546; 414/921

[58] Field of Search ............... 414/539, 540, 541, 545, 414/556, 557, 921; 280/166

[56] References Cited

U.S. PATENT DOCUMENTS

| | | | |
|---|---|---|---|
| 3,893,697 | 7/1975 | Blitz et al. | 414/921 X |
| 4,027,807 | 6/1977 | Thorley | 414/921 X |
| 4,029,223 | 6/1977 | Adamski et al. | 414/921 X |
| 4,039,091 | 8/1977 | Adamski et al. | 414/556 |
| 4,058,228 | 11/1977 | Hall | 280/166 X |
| 4,081,091 | 3/1978 | Thorley | 414/545 |
| 4,134,504 | 1/1979 | Salas et al. | 414/921 X |
| 4,158,524 | 6/1979 | Serafin | 414/921 X |

*Primary Examiner*—James L. Rowland
*Attorney, Agent, or Firm*—Stanley G. Ade

[57] ABSTRACT

The lift comprises a pair of side plates with hand rails and a floor panel hinged to one side plate at the base thereof for movement from a platform position to a substantially vertical, non-operating position and vice versa. The lift is situated in a vehicle door opening in place of the usual steps and can be moved hydraulically from a ground engaging position outside of the vehicle to a position inside the vehicle and upon the floor thereof. A step insert is provided for normal entering and leaving when the device is not in use and the floor panel is in the uppermost non-operating position.

24 Claims, 5 Drawing Figures

COMBINATION WHEELCHAIR LIFT AND STEPS FOR VEHICLE DOORWAYS

BACKGROUND OF THE INVENTION

This invention relates to new and useful improvements in load lifting mechanisms for doorways of vehicles such as buses, vans or the like and of course can be used as a lifting mechanism within doorways of buildings if desired.

The device is designed primarily for use by handicapped people with or without wheelchairs, although it can be used for the elevation and lowering of loads to and from a vehicle.

Conventionally, such devices are extremely bulky and take up a considerable amount of room within the vehicle and in some instances, require part of the equipment to be situated externally of the vehicle.

Prior art devices known to the applicant which may be considered are U.S. Pat. Nos. 4,027,807-4,081,091 and 4,029,223. These disclose pneumatically operated folding and lifting means that can be used as wheelchair lifts or as steps.

However none of these devices utilizes the same or similar folding and lifting mechanism as the present device and the present device constitutes an improvement over these prior art devices inasmuch as the present device is simple in construction and operation, can be readily fitted into an existing vehicle, and in general is far less expensive than the prior art devices. Furthermore, it takes up very little room when in the non-operating position and is easily converted for use by handicapped personnel when desired.

As an example, the first two patents both show an extending and retracting platform which then has to be elevated or lowered independently as it moves from the ground level to the vehicle floor level.

SUMMARY OF THE INVENTION

The present invention overcomes disadvantages inherent in prior art devices and in accordance with the invention there is provided in a vehicle doorway opening which includes an upper vehicle floor portion and a lower vehicle base portion; a selectively operable wheelchair lift assembly in said doorway, said lift assembly comprising in combination a pair of spaced and parallel side panels and a floor panel, at least the front portion of said floor panel being hinged adjacent the base of one of said side panels and being movable from a load receiving platform position to a substantially vertical stored position against the side panel to which it is hinged, and vice versa, a linkage arm assembly mounting said lift assembly for movement between a ground engaging position outside of said vehicle doorway to a vehicle floor engaging position within said vehicle and vice versa and means operatively connected to said lift assembly for moving same from one position to the other.

Another advantage of the invention is to provide a device of the character herewithin described which can be engaged within the doorway opening of a vehicle merely by removing the existing steps and substituting a step insert which can be used for entering and leaving the vehicle when the device is in the non-operative position.

Another advantage of the present invention is to provide a device of the character herewithin described which swings up in an arc from the ground engaging loading position to the vehicle floor engaging or unloading position and vice versa.

A still further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
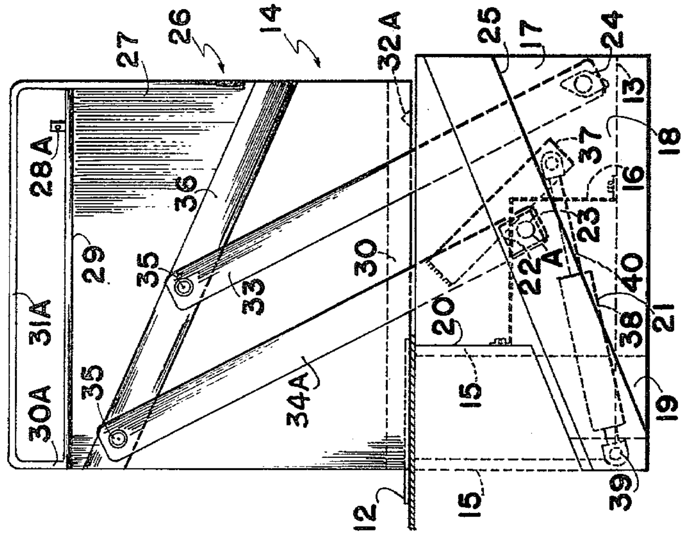
FIG. 1 is a side elevation of the device shown in the uppermost position.

Proceeding to describe the invention in detail, reference should first be made to FIG. 1 in which 10 illustrates a vehicle doorway defined by the door side walls 11, the upper floor level 12 of the vehicle, and the lower floor level 13 thereof.

The device collectively designated 14 is engaged within the doorway or door opening and is secured to the side walls 11 and rests upon the lower floor portion 13 and against the vertical riser (see FIG. 1) 15 extending between the upper vehicle floor level 12 and the lower vehicle floor level 13.

A simple step insert (see FIG. 1) indicated by reference character 16, is secured to the riser 15 and the lower floor 13 to provide access when the device is in the non-operating position.

A pair of spaced and parallel mounting plates 17 in which the major portion 18 thereof is substantially rectangular when viewed in side elevation as shown in FIG. 1. A rearwardly extending lower portion 19 extends from the rear vertical edge 20 and acts as an anchor support means for a fluid operator 21, upon each side plate thereof as will hereinafter be described.

Figure 3:
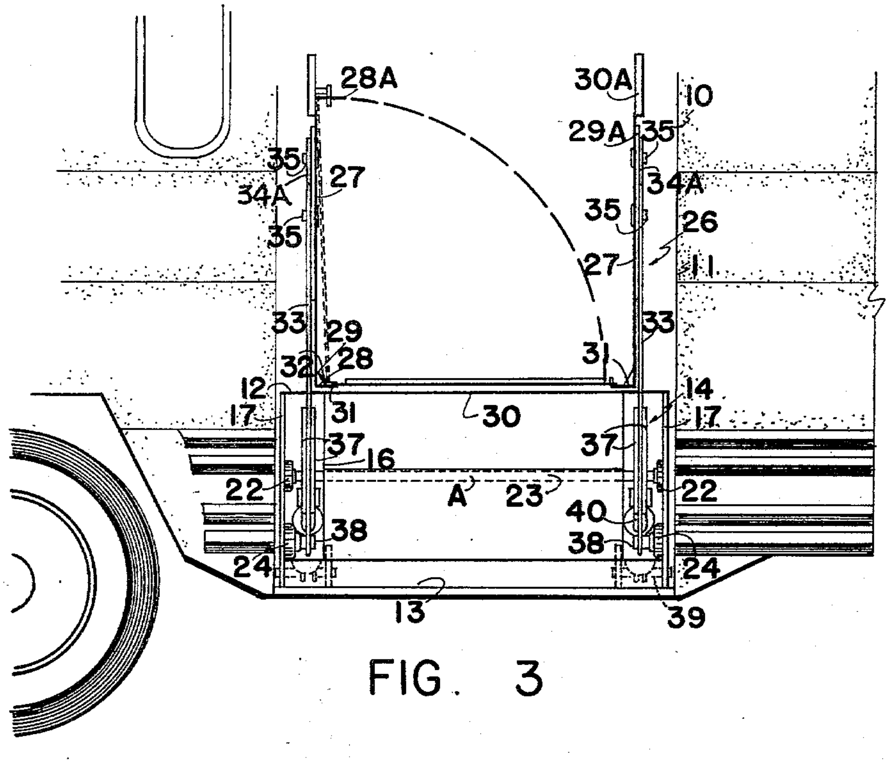
FIG. 3 is a front elevation of FIG. 1 showing the device within a vehicle doorway.

Pin blocks or bearings 22 are mounted on the inner faces of these mounting plates 17 and a rocker shaft 23 extends between the two bearings 22 as shown in FIG. 3 and engages under the step insert 16 also as shown in FIG. 1.

Sulphur lining pin blocks or bearings 24 are also secured to the side plates 17 adjacent the lower front corners thereof, the purpose of which will hereinafter become apparent. It should also be noted that a diagonally situated reinforcing plate 25 is secured to the outside of the side plates 17 for strengthening purposes and that the pin blocks or bearings 22 are mounted in the areas reinforced by these plates.

The upper or movable portion collectively designated 26 comprises a pair of spaced and parallel side panels 27 which are substantially rectangular when viewed in side elevation. Inturned lower portions 28 extend from front to rear of the bases of these panels and a diagonal plate 29 is welded as shown in FIG. 3, to reinforce these flanges 28.

Figure 4:
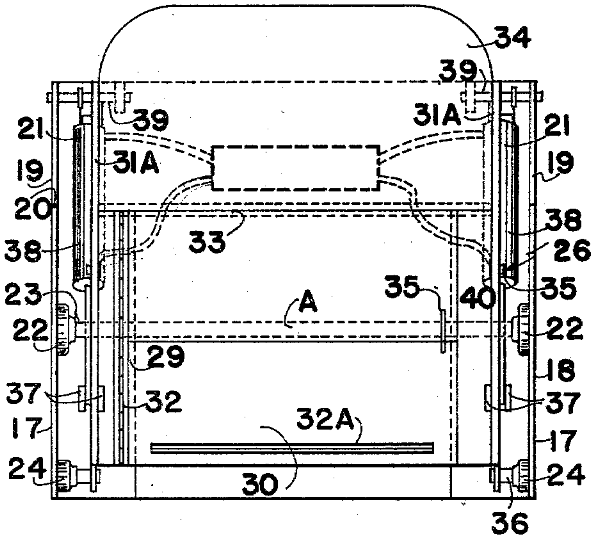
FIG. 4 is a top plan view of FIG. 1.

A substantially rectangular floor panel 30 is hinged by one side edge thereof to one edge 31 of one of the flanges 28, reference character 32 illustrating the hinge. Reference to FIG. 4 will show that this hinged floor panel 30 extends from adjacent the front side edges of the side panels, to a point indicated by reference character 33, which is approximately two thirds of the way towards the rear side edges of the side panel. A fixed floor panel or plate 34 extends between the flanges 28 of this rear portion and is in planar relationship with the hinged floor panel 30 when the hinged floor panel is in the lowermost position illustrated in full line in FIG. 3. However this hinged portion 30 can be lifted by means of handle 35, to a substantially vertical position shown in phantom in FIG. 3 against one side panel 27 to which it may be detachably secured by a swing latch 28A extending upwardly from the upper side 29 of the side panel. A hand rail 30A surmounts the upper sides of each side panel 27 and includes the horizontal portion 31A spaced and parallel from the upper side edge 29A of the side panels. These side rails or hand rails assist in steadying the person being moved by the lift assembly.

Figure 2:
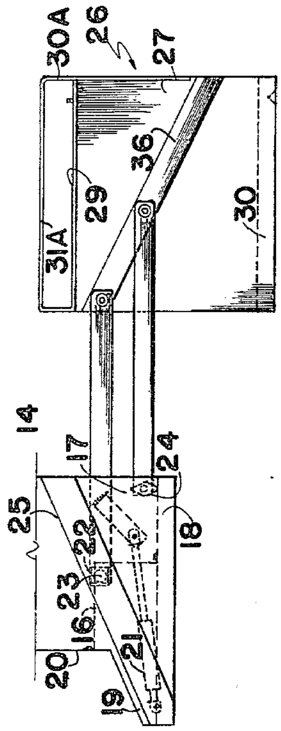
FIG. 2 is a view similar to FIG. 1 but showing the device in the lowered position.

The upper portion collectively designated 26 may be moved from the lowermost or ground engaging position shown in FIG. 2 in which the upper portion is outside of the vehicle, to a raised or elevated vehicle floor engaging position shown in FIG. 1 and vice versa. When in the position shown in FIG. 1, the fixed floor plate 34 is situated flat upon the upper vehicle floor 12 so that an occupant either in a wheelchair or not, can readily be moved from the vehicle floor to the floor of the upper portion or vice versa.

Also, it will be noted, that when the device is in the lowermost position shown in FIG. 2, the occupant either in a wheelchair or not, can be moved from the ground surface onto the floor or from the floor onto the ground surface with very little difficulty. At this point it should be noted that a small ramp 32A extends across a adjacent the front edge of the hinged floor portion 30 to assist in maintaining the wheelchair upon the floor during elevation or lowering thereof.

A pair of parallel arms or links 33 and 34A are pivotally secured by pivot pins 35, to the outside of each of the side panels 27 and in this connection a reinforcing plate or bar 36 is secured to the outside of the panels as shown in FIG. 1.

The lower ends of the links 34A are secured one to adjacent each end of the aforementioned shaft 23 extending between the bearing 22 and the lower ends of the links 33 are pivotally secured to the aforementioned self-aligning pin blocks or bearings 24 by means of pivot pins 36 as clearly illustrated, so that the links 33 and 34A form a parallelogram.

A driver arm 37 is secured as by welding, by one end thereof to each of the links 34A just above the connection of these links to the shaft 23 and these driver arms lie in a plane at an angle to the longitudinal axis of the links 34A as illustrated in FIG. 1.

The aforementioned fluid operators, take the form of hydraulic piston and cylinder assemblies in this embodiment with the cylinders 38 being pivotally secured by one end thereof by pivots 39, to the aforementioned rearwardly extending portions 19 of the lower mounting plates. The piston rods 40 are in turn pivotally secured adjacent the distal ends of the driver arms 37.

From the foregoing it will be appreciated that extension of the piston and cylinder assemblies 21 will move the upper portion 26 from the position shown in FIG. 1, to the position shown in FIG. 12 and that retraction of the piston and cylinder assemblies will move the upper portion 26 from the position shown in FIG. 2, from the position shown in FIG. 1.

It will also be observed that the parallelogram arrangement of the links 33 and 34A will maintain the floor of the upper portion, substantially parallel at all times thus facilitating in the transportation of personnel from the vehicle to the ground and vice versa.

In operation, when the device is not in use, it is situated in the raised position shown in FIG. 1 with the movable floor panel 30 in the substantially vertical position shown in phantom in FIG. 3 then held in this position by means of catch 28A.

The rear fixed floor panel 34 lies flat upon the upper floor 12 of the vehicle and therefore does not interfere with normal entering or leaving of the vehicle. The step insert 16 enables people to enter and leave the vehicle in the normal manner.

If however a handicapped person either in a wheelchair or not, wishes to enter the vehicle, then the movable floor panel 30 is lowered to the position shown in full line in FIG. 3 and the fluid operators 21 are actuated to move the upper portion 26 of the device, to the lowered position shown in FIG. 2 whereupon the handicapped person may step onto the floor 30 or may be wheeled in a wheelchair upon the floor 30 with the hand rails 30A being used to steady the person if necessary.

The fluid operators 21 are then retracted thus raising the upper portion 26 in an arc to the position shown in FIG. 1 whereupon the handicapped person may step onto the floor 12 of the vehicle or may wheel or be wheeled onto this floor portion.

Figure 5:
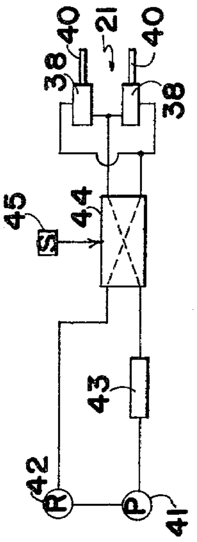
FIG. 5 is a simplified schematic view of the hydraulic circuit.

The hydraulic system shown in simplified form in FIG. 5 is substantially conventional and includes a pump 41 which may be driven by the engine of the vehicle (not illustrated), and connected to a fluid reservoir 42. An inline gate valve 43 is situated between the pump and a direction control valve 44 which is connected to the piston and cylinder assemblies 38 in the usual manner.

An electrical "up-down" switch 45 operates the direction control valve and enables the fluid operators to retract or extend as desired. This may be situated either adjacent the driver of the vehicle or adjacent the doorway so that it can be operated by a person wishing to use same. It is normal to provide both switches, each switch being in parallel with the other so that actuation can take place from either location.

Since various modifications can be made in our invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What we claim as our invention:

1. In a vehicle doorway opening which includes an upper vehicle floor portion and a lower vehicle base portion; a selectively operable wheelchair lift assembly in said doorway, said lift assembly comprising in combination a pair of spaced and parallel side panels and a floor panel, at least the front portion of said floor panel being hinged adjacent the base of one of said side panels and being movable from a load receiving platform position to a substantially vertical stored position against the side panel to which it is hinged, and vice versa, a linkage arm assembly mounting said lift assembly for movement between a ground engaging position outside of said vehicle doorway to a vehicle floor engaging position within said vehicle and vice versa and means operatively connected to said lift assembly for moving same from one position to the other.

2. The device according to claim 1 which includes a step insert within said door opening between said vehicle floor portion and the lower vehicle base portion for entering and leaving the vehicle when said lift assembly floor panel is in the substantially vertical, stored position.

3. The device according to claim 1 in which the floor panel includes said front hinged portion and a fixed rear portion also extending between said side panels at the bases thereof, said rear portion engaging upon the upper vehicle floor when said lift assembly is in the vehicle floor engaging position, said portions of said floor panels being in planar relationship one with the other when said hinged portion is in the load receiving platform position.

4. The device according to claim 2 in which the floor panel includes said front hinged portion and a fixed rear portion also extending between said side panels at the bases thereof, said rear portion engaging upon the upper vehicle floor when said lift assembly is in the vehicle floor engaging position, said portions of said floor panels being in planar relationship one with the other when said hinged portion is in the load receiving platform position.

5. The device according to claim 1 in which said assembly also includes a pair of spaced and parallel mounting plates outboard of said side panels, said mounting plates being secured one each side of the vehicle doorway opening, said linkage arm assembly being pivotally connected by the inner ends thereof to said mounting plates and by the outer ends thereof, to said side panels.

6. The device according to claim 2 in which said assembly also includes a pair of spaced and parallel mounting plates outboard of said side panels, said mounting plates being secured one each side of the vehicle doorway opening, said linkage arm assembly being pivotally connected by the inner ends thereof to said mounting plates and by the outer ends thereof, to said side panels.

7. The device according to claim 3 in which said assembly also includes a pair of spaced and parallel mounting plates outboard of said side panels, said mounting plates being secured one each side of the vehicle doorway opening, said linkage arm assembly being pivotally connected to the inner ends thereof to said mounting plates and by the outer ends thereof, to said side panels.

8. The device according to claim 4 in which said assembly also includes a pair of spaced and parallel mounting plates outboard of said side panels, said mounting plates being secured one each side of the vehicle doorway opening, said linkage arm assembly being pivotally connected by the inner ends thereof to said mounting plates and by the outer ends thereof, to said side panels.

9. The device according to claim 1 in which said linkage arm assembly includes a pair of parallel links each side of said lift assembly, mounted for parallelogram movement thereby maintaining said floor panel of said lift assembly, substantially horizontal when moving from one position to the other.

10. The device according to claim 2 in which said linkage arm assembly includes a pair of parallel links each side of said lift assembly, mounted for parallelogram movement thereby maintaining said floor panel of said lift assembly, substantially horizontal when moving from one position to the other.

11. The device according to claim 3 in which said linkage arm assembly includes a pair of parallel links each side of said lift assembly, mounted for parallelogram movement thereby maintaining said floor panel of said lift assembly, substantially horizontal when moving from one position to the other.

12. The device according to claim 4 in which said linkage arm assembly includes a pair of parallel links each side of said lift assembly, mounted for parallelogram movement thereby maintaining said floor panel of said lift assembly, substantially horizontal when moving from one position to the other.

13. The device according to claim 5 in which said linkage arm assembly includes a pair of parallel links each side of said lift assembly, mounted for parallelogram movement thereby maintaining said floor panel of said lift assembly, substantially horizontal when moving from one position to the other.

14. The device according to claim 6 in which said linkage arm assembly includes a pair of parallel links each side of said lift assembly, mounted for parallelogram movement thereby maintaining said floor panel of said lift assembly, substantially horizontal when moving from one position to the other.

15. The device according to claim 7 in which said linkage arm assembly includes a pair of parallel links each side of said lift assembly, mounted for parallelogram movement thereby maintaining said floor panel of said lift assembly, substantially horizontal when moving from one position to the other.

16. The device according to claim 8 in which said linkage arm assembly includes a pair of parallel links each side of said lift assembly, mounted for parallelogram movement thereby maintaining said floor panel of said lift assembly, substantially horizontal when moving from one position to the other.

17. The device according to claims 1, 2 or 3 in which said means operatively connected to said lift assembly for moving same includes at least one fluid operator operatively connected between said vehicle and said lift assembly.

18. The device according to claim 4 in which said means operatively connected to said lift assembly for moving same includes at least one fluid operator operatively connected between said vehicle and said lift assembly.

19. The device according to claims 5, 6 or 7 in which said means operatively connected to said lift assembly for moving same from one position to the other includes at least one fluid operator operatively extending between said mounting plates and said lift assembly.

20. The device according to claim 8 in which said means operatively connected to said lift assembly for moving same from one position to the other includes at least one fluid operator operatively extending between said mounting plates and said lift assembly.

21. The device according to claims 9, 10 or 11 in which said means operatively connected to said lift assembly for moving same includes at least one fluid operator operatively connected between said vehicle and said lift assembly.

22. The device according to claim 12 in which said means operatively connected to said lift assembly for moving same includes at least one fluid operator operatively connected between said vehicle and said lift assembly.

23. The device according to claims 13, 14 or 15 in which said means operatively connected to said lift assembly for moving same from one position to the other includes at least one fluid operator operatively extending between said mounting plates and said lift assembly.

24. The device according to claim 16 in which said means operatively connected to said lift assembly for moving same from one position to the other includes at least one fluid operator operatively extending between said mounting plates and said lift assembly.

* * * * *